United States Patent Office 2,746,309
Patented May 22, 1956

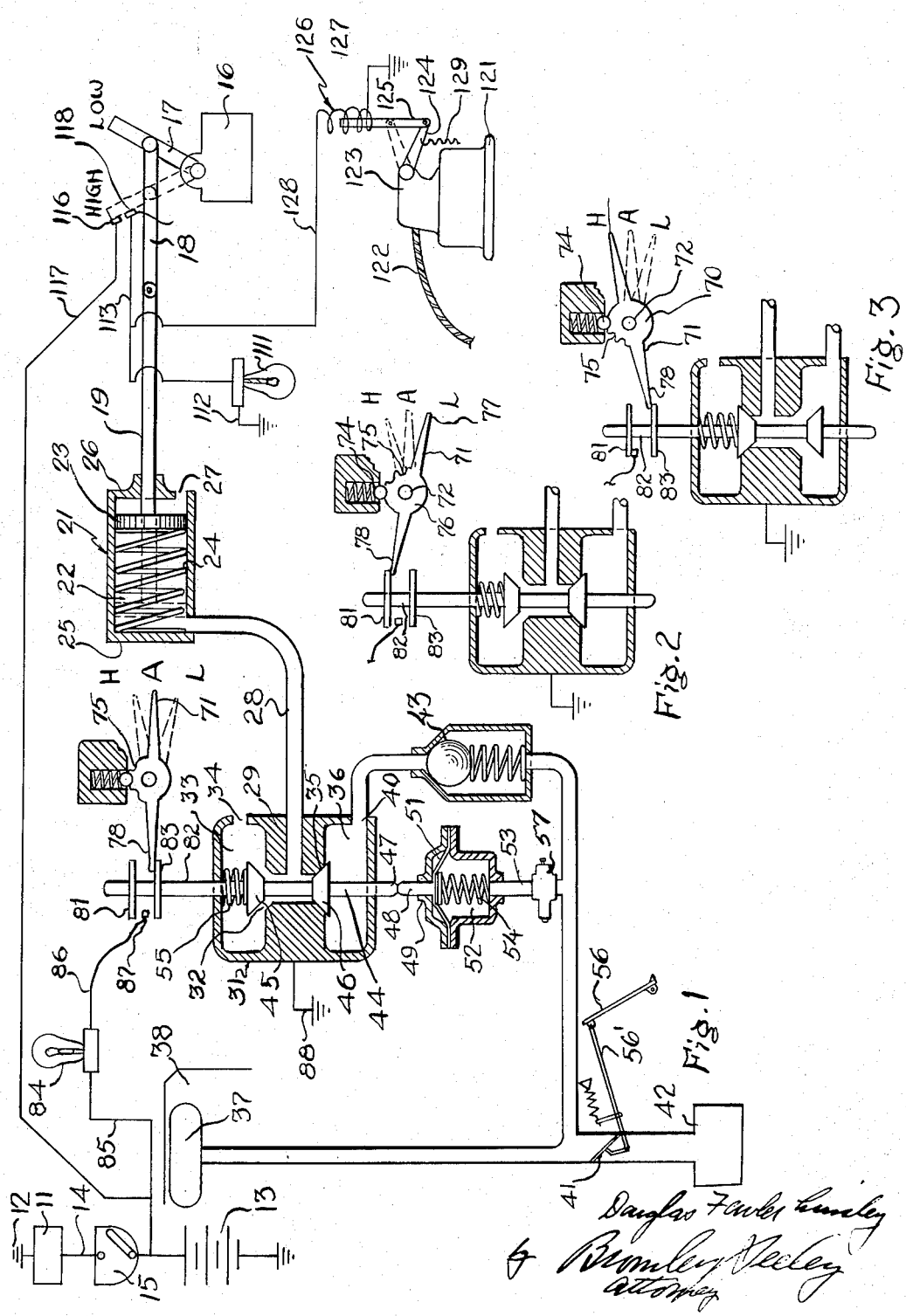

2,746,309

CONTROL SYSTEM FOR POWER TRANSMISSIONS

Douglas Fowler Linsley, Westport, Conn., assignor to Myrick A. Walden, East Haddam, Conn.

Application April 3, 1951, Serial No. 218,933

11 Claims. (Cl. 74—335)

This invention relates to multi-speed power transmissions, such, for example, as those employed on motor vehicles, and more particularly to an improved system for controlling and effecting the operation of shifting such transmissions from one gear ratio to another.

Without limiting it to such use, the present invention is herein illustrated and described, for the purposes of disclosure, in connection with a two-speed axle transmission of the type used, for example, on trucks, and also on passenger cars to provide an "overdrive." Such a transmission comprises high and low speed gears and a shift mechanism for selectively shifting the transmission from one gear ratio to another.

The systems heretofore employed for this purpose have not been satisfactory. For one thing, they have involved complicated and expensive constructions frequently including electrically operated parts which require wiring connections and add to the expense of installation and operation. For another, their use has usually called for various complicated foot or hand operations by the driver, frequently requiring removal of his hand from the steering wheel and his eyes from the road. Because of the complications involved in operating such systems, many drivers refuse to use them and thus lose the substantial advantages of the associated transmission, such a the two-speed axle drive.

An object of this invention is to provide an improved and simplified control system for the purpose described, constructed and arranged to enable a driver to shift at will from one gear ratio to another without requiring any manual operation by the driver.

A further object is to provide a transmission control system having an improved arrangement for signalling the driver when a gear shift is desirable.

A further object is to provide an improved control system for use with two-speed axle transmissions in which the transmission is automatically shifted into low gear and held therein whenever the vehicle engine is stopped whether by cutting the ignition, stalling, or in any other way.

A further object is to provide an improved all mechanical system having no electrical operating units or controls, the only electrical parts being signal lights and connections, as hereafter described.

A further object is to provide an improved control system for automatically shifting an associated transmission into a selected gear ratio at will, constructed and arranged to permit locking the system whenever desired to retain the transmission in a selected gear under all conditions of vehicle operation.

A further object is to provide an improved control system for two-speed axle transmissions, constructed and arranged to selectively lock the transmission in either high or low gear, or to automatically shift the transmission from one gear to another, as desired.

A further object is to provide a control system employing a pressure differential operated power unit for shifting the transmission of a motor vehicle, and controlling the operation thereof by the manifold vacuum of the associated engine.

A further object is to provide a control system of the type and for the purposes set forth, the operation of which can be effected simply through manipulation of the accelerator pedal and the throttle valve of the associated vehicle.

Inasmuch as vehicle speedometers are now generally driven from the vehicle drive shaft, or the transmission output shaft, or the like, it is necessary to change the gearing in the speedometer drive located in or on the speedometer housing when shifting gears in an axle transmission, in order to obtain true speedometer reading. Heretofore mechanisms employed for this purpose have frequently produced a change in the speedometer gearing before a corresponding change in the axle transmission, resulting in a false speedometer reading.

A further object of this invention is to provide an improved mechanism for shifting the speedometer drive gears when and only when the axle transmission gears are shifted so that the speedometer gives a true reading at all times.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 1 is a diagrammatic view showing a transmission control and operating system constructed in accordance with one embodiment of the invention employing a differential pressure operated power unit actuated in one direction by vacuum and in the other by spring pressure;

Figs. 2 and 3 are similar views of the control valve shown in Fig. 1, illustrating the different positions in which it can be locked to hold the transmission in a selected gear ratio;

Figure 4:
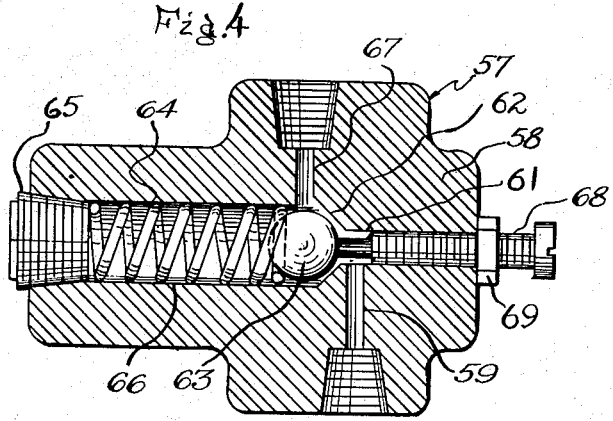
Fig. 4 is a section of a valve detail.

The present invention is shown in connection with the ignition system 11 of a motor vehicle provided with a ground connection 12 at one side and connected to battery 13 or other source of potential by a conductor 14 through a conventional ignition switch 15.

For the purposes of disclosure, the control system constituting the present invention is herein shown and described in connection with a two-speed axle transmission 16 of conventional construction for a motor vehicle, and indicated diagrammatically on the drawing, and having the usual high speed and low speed gearing (not shown). The shift mechanism for shifting the transmission from one speed to another may be of any desired type and is diagrammatically shown as including a shift lever 17 connected to one end of a pivoted link 18, the opposite end of which is pivoted to one end of a power operated shift rod 19 adapted to be actuated by a power unit 21 for selectively shifting the transmission 16 from one gear ratio to another.

The power unit as illustrated in Fig. 1 includes a chamber 22 in which a movable member, which is shown in the form of a sliding piston 23, but may be a flexible diaphragm, or the like, responsive to pressure differential, is connected to the adjacent end of the reciprocable, power-operated shift rod 19. In the form shown in Fig. 1, a compression spring 24 is positioned between the piston 23 and one end wall 25 of the chamber 22, so that the spring tends to move the power shift rod 19 and shift lever 17 to the right as shown in Fig. 1, and engage the transmission in low gear. The end wall 26 of the chamber 22 opposite the spring 24 has a vent 27 to the atmosphere.

On the opposite side of the piston or diaphragm 23 from the vent 27, the chamber 22 is connected by a tube or conduit 28 to a port 29 centrally located in the housing of a valve 31 controlling the operation of the power unit 21. The control valve 31 has an upper port 32 leading to a chamber 33 communicating with the atmosphere through a vent 34 by means of which the chamber 22 is vented to atmosphere when the control valve is in one of its operative positions, the upper position as shown in Fig. 1. The valve has a lower port 35 leading to a chamber 36 having a port 40 connected to the inlet manifold 37 of the internal combustion engine 38 on the associated vehicle for applying vacuum to the chamber 22 when the valve is in a second operative position, the lower position as shown in Fig. 1. The conduit 39 is connected to the manifold above a throttle valve 41 and a carburetor 42. A check valve 43 in the conduit 39 adjacent the control valve 31 prevents pressure flow from the manifold into the control valve 31, thereby preventing any break in the manifold vacuum from being transmitted through the control valve 31 to the power unit 21.

The control valve 31 includes a valve rod 44 having an upper valve body 45 controlling the upper vented port 32, and a lower valve body 46 controlling the lower port 35, the two valve bodies being so spaced that when the rod 44 is raised to close the lower port 35 with the lower valve body 46, the upper vented port 42 is open and the chamber 22 of the power unit open to atmosphere, while when the rod 44 is lowered to close the upper port 32, the lower port 35 is open to the conduit 39 through the check valve 43 and the chamber 22 is connected to manifold vacuum.

Although any source of pressure differential can be employed, in the form illustrated use is made of manifold vacuum for operating the gear shifting power unit 21 and also for controlling and timing such operation, without resorting to any electric devices or circuits. For this purpose, operation of the valve 31 is controlled by manifold vacuum and the valve rod 44 is made responsive to vacuum in the inlet manifold 37.

As illustrated in Figs. 1, 2 and 3, the lower end 47 of the valve rod 44 engages the upper end 48 of a pin 49 connected to and movable with a flexible diaphragm 51, which may, if preferred, be a piston or the like, in a closed chamber 52 connected to the vacuum conduit 39 through a connecting conduit 53. A compression spring 54, interposed between the other end of the chamber from the pin 49 and the diaphragm 51, tends to press the diaphragm and pin 49 into engagement with the valve rod 44. When the manifold vacuum rises above a determinate amount, for example, about two inches of mercury, the diaphragm 51 and pin 49 will be drawn downwardly in Fig. 1 into the chamber 52 against the pressure of the spring 54. This allows the valve spring 55, which is compressed between the upper valve body 45 and the valve housing, to move the valve bodies 45, 46 to open the lower valve port 35 to vacuum and close the upper, vented port 32. This applies vacuum to the chamber 22 in the power unit 21 and draws the piston 23, shift rod 19 and shift lever 17 to the left in Fig. 1, shifting the transmission into high gear. When the vacuum drops below the determinate amount the spring 54 moves the diaphragm 51, pin 49 and valve bodies 45, 46 to close the lower valve port 35 and open the vented port 32, thereby destroying the vacuum in the power unit 21 and permitting the spring 24 to move the piston 23 and associated shift rod 19 and lever 17 to the right in Fig. 1 and shift the transmission into low. The relative strengths of the valve spring 55 and the diaphragm spring 54 is such that the diaphragm spring 54 lifts the valve against the pressure of the spring 55 whenever manifold vacuum is below the determinate amount, preferably about two inches of mercury.

For purposes to be hereinafter described, the system is arranged to shift the valve rod 44 in the direction to dump or break the vacuum quickly from the power unit upon a break in manifold vacuum and thus shift the transmission quickly into low, but to delay movement in the opposite direction and thus delay the shift to high when manifold vacuum is restored. This can be done in any desired way, for example by a dash pot (not shown) on the valve rod 44 to effect a slow return from low gear to high gear position, or, as illustrated in Fig. 1, for example, by an adjustable check valve 57 provided in the connecting conduit 53 between the diaphragm chamber 52 and the conduit 39. As shown in Fig. 4, the check valve 57 comprises a housing 58 having a flow passage 59 communicating with a bore 61 formed with a valve seat 62 for a ball valve 63 pressed toward the seat by a spring 64 compressed between the ball and a closure plug 65 threaded in the end of a second bore 66 forming a continuation of the bore 61. A second flow passage 67 communicates with the bore 66 on the opposite side of the valve seat 62 from the first flow passage 59. The first flow passage 59 is connected to the conduit 53 leading to the conduit 39, while the second flow passage 67 is connected to the chamber 52. A valve adjusting screw 68 is threaded into the outer end of bore 61 and can be secured in adjusted position by a lock nut 69 or similar device. The inner end of the adjusting screw 68 is positioned to hold the ball valve 63 slightly off the seat 62 against the pressure of the spring 64. By this means, when the vacuum is broken in the inlet manifold, the increase in pressure is transmitted instantly to the diaphragm 51 to permit the spring 54 to quickly raise the valve stem 44 and dump vacuum from the power unit 21, allowing the spring 24 to shift the transmission into low gear. Upon re-establishment of vacuum in the manifold, the check valve 57 delays the effect thereof on the diaphragm 51 and valve stem 44, thereby delaying the application of vacuum to the power unit 21, and the resulting shift into high gear, the time required being determined by the adjustment of the screw 68 which fixes the size of the opening between the ball valve 63 and its seat 62. It will be apparent that other slow return devices for delaying the shift into high upon re-establishment of manifold vacuum can be employed.

The present system is arranged to permit automatic operation of the gear shifting mechanism, or to eliminate such automatic operation when desired and selectively lock the transmission 16 in either high or low gear, for as long as desired regardless of varying conditions of vehicle operation. As illustrated, a control lever 71 is pivotally mounted on a supporting pin 72 or the like, and a detent mechanism, shown as comprising a spring-pressed detent ball 74 adapted to engage in any one of three detent grooves 75 in the lever hub 76, is arranged to hold the lever in any one of three positions conditioning the mechanism for automatic operation, or locking the system in either high or low gear ratio. The outer end 77 of the lever 71 forms a finger or hand grip. The inner end 78 is operatively associated with means for holding the valve rod 44 against movement in either high or low gear position when engaged by the lever 71. As shown in Figs. 1, 2, 3 and 5, a low gear locking collar 81 is secured to an extension 82 of the valve rod 44 in position to be engaged by the inner end 78 of the lever 71. A high gear locking collar 83 is secured to the valve rod extension 82 at the side of the lever 71 opposite to the low gear locking collar 81 in position to be engaged by the lever.

To bring the system into automatic operation, all that is required is to position the lever 71 in its central position, shown as marked "Automatic," and the lever can then be left permanently in such position as long as it is desired to use automatic shifting. In this position neither collar is held against movement by the lever and the control valve 31 is free to move from one operative position to the other.

In operation, assuming, for example, that the control lever 71 is set for automatic operation of the shift mechanism, and the engine of the associated vehicle (not shown) is idling with the vehicle stationary, the vacuum established in the inlet manifold 37 actuates the valve 31 by drawing the diaphragm 51 in the chamber 52 downwardly, as shown in Fig. 1, against the pressure of the spring 54, thus permitting the valve spring 55 to lower the valve rod 44, close the vented port 32 and open the vacuum port 35. This applies vacuum to the power unit 21 and draws the piston or diaphragm 23 to the left in Fig. 1 against the pressure of the spring 24. This moves the shift rod 19 and shift lever 17 into the broken line position shown in Fig. 1, and shifts the transmission 16 into high gear. However, the main vehicle transmission being in neutral, the engine continues to idle and the vehicle remains stationary. It will, of course, be understood that the vehicle may be operated and the successive gear ratios of the conventional vehicle transmission be shifted through and into high with the two-speed axle transmission in high and without shifting the latter into low gear. This may be the case, for example, with unloaded trucks when the torque required to attain or maintain speed is not high. However, assuming that it is desirable or necessary to shift the two-speed axle transmission into low gear ratio to start movement of the vehicle and attain speed, as will be the case with a loaded truck or other vehicle, such shift of the axle transmission into low can be done while idling the engine, merely by depressing an accelerator pedal 56, connected by a rod 56' to the throttle 41, to open the throttle 41 far enough to break the vacuum in the inlet manifold and this break in vacuum is immediately effective on the diaphragm 51 through the check valve 57. This relieves the diaphragm 51 of vacuum pull and allows the diaphragm spring 54 to raise the valve rod 44 against the pressure of the valve spring 55, raising the valve bodies 45, 46 and dumping the vacuum from the power unit 21 by venting the unit through the vent port 34. The spring 24 in the power unit 21 immediately shifts the transmission into low gear as shown in solid lines in Fig. 1. Assuming that this operation has been performed with the main vehicle transmission in high but the clutch disengaged, subsequent letting up on the accelerator pedal partially closes the throttle 41 and re-establishes vacuum in the manifold, but the effect of such vacuum on the diaphragm 51 is delayed by the check valve 57 long enough for the driver to engage the vehicle clutch while the axle transmission is still in low. This applies torque to the drive shaft and the transmission gears before the control valve 31 is again returned to high gear position and this application of torque holds the gears of the axle transmission in low even after the diaphragm 51 and the power unit 21 are again subjected to full vacuum. Thus, although the system is conditioned for operation in high gear in the axle transmission as a result of the re-establishment of vacuum, it will be held in low by the driving torque until the latter is released. Under these circumstances the vehicle will be started with the axle transmission held in low by the torque on the gears although the system is conditioned for shift into high. Therefore, upon attaining suitable speed the two-speed axle transmission can be shifted into high merely by letting up on the accelerator pedal 56 to reverse the torque on the gears, whereupon the vacuum already established in the chamber 22 of the power unit 21 causes the piston or diaphragm 23 to shift the transmission into high. This is done without declutching the truck transmission which remains, for example, in low.

This same operation can be repeated in each upward shift of the vehicle transmission. The result is to double the number of gear ratios that can be obtained from a standard vehicle transmission.

In the same manner, the delay valve permits a downshift with the vehicle in motion without declutching, by giving the driver time to increase engine speed and apply torque to the gears while they are still in low.

When the vehicle is moving with the two-speed axle transmission in high gear, a downshift to low gear is easily made, when the lever 71 is set for automatic operation, by breaking the manifold vacuum through pressing the accelerator pedal 56 far enough to open the throttle 41 wide. This breaks the vacuum in the line 39 and in the chamber 52, allowing the spring 54 to raise pin 48 and valve rod 44 to thereby dump vacuum from the power unit 21. This conditions the power unit for shifting into low gear under pressure of the spring 24. However, the driving torque on the gears holds them in high until the accelerator pedal 56 is let up to close the throttle 41 and reverse the torque on the gears. This torque reversal allows the power unit spring 24 to shift the transmission 16 into low before the slow return valve 57 permits the vacuum, re-established by the throttle closing, to return the diaphragm 51 and control valve 31 to high gear position. After the shift to low, immediate re-opening of the throttle by pressing the pedal down again applies torque to the gears and holds them in low, even with vacuum re-established, until such torque is again relieved by pedal manipulation to close the throttle, whereupon the shift back into high is automatically accomplished. This shifting operation is done quickly and easily. If the driver prefers, he can relieve torque on the gears by clutch disengagement, but this requires operating the vehicle clutch pedal (not shown) in addition to the throttle 41 and is not necessary.

When the vehicle engine is stopped, either intentionally by cutting the ignition, by stalling, or for any other reason, the resulting break in vacuum vents the control valve 31 and the power unit 21 and permits the spring 24 to immediately shift the axle transmission into low gear where it is retained by spring pressure until the engine is restarted and vacuum restored. This insures against possible slipping out of gear through dissipation of the pressure differential on the power unit, or for any other reason while the vehicle is left parked. If the engine is stopped on a down grade with the transmission in high and torque on the gears, it will, of course, remain in high because of such torque. If the vehicle starts pushing the engine it will still remain in high because turning the engine will establish the necessary vacuum in the manifold. The axle transmission is thus always in gear when the vehicle is stopped and no slipping out of gear is possible.

Figure 5:
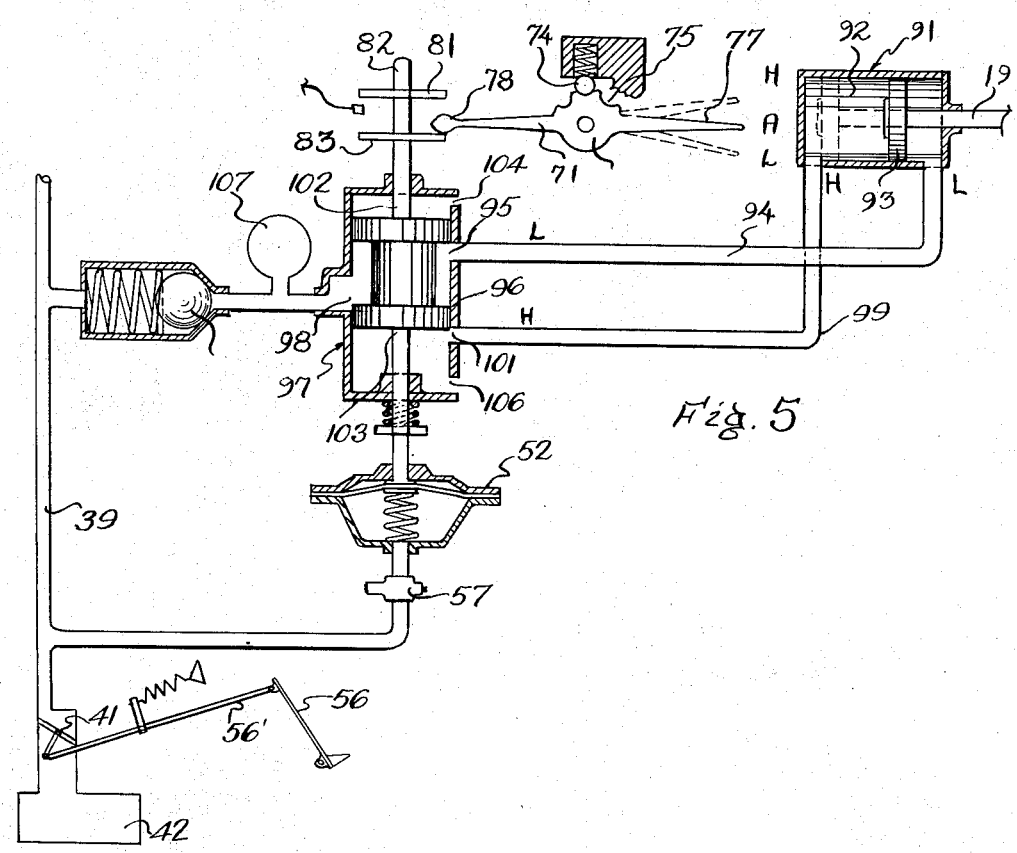
Fig. 5 is a view similar to Fig. 1, showing the invention adapted to a differential pressure operated power unit which is vacuum operated in both directions.

In Figure 5 the invention is illustrated in connection with an all vacuum power unit 91 in place of the vacuum and spring unit 21 shown in Fig. 1. As illustrated, the power unit comprises a chamber 92 having a piston or diaphragm 93 connected to the operating rod 19. One end of the chamber 92 is connected by a conduit 94 to an upper port 95 at one side of a valve chamber 96 in a control valve 97 having a central port 98 connected through the check valve 43 to the vacuum conduit 39. The other end of the chamber 92 is connected by a conduit 99 to a lower port 101 at the other side of the valve chamber 96 opposite the port 95. A valve rod 102 has a spool valve body 103 adapted to connect upper port 95 either with the central port 98 or with a vent 104 to atmosphere in the valve housing, and to connect the lower port 101 either with the central port 98 or to a vent 106 to atmosphere. In this construction raising the valve rod 102 causes vacuum to be applied to the right hand end of the power unit 21 in Fig. 1 and vents the opposite end through vent port 106, thereby causing the piston 93 to move to the right and shift the transmission into low gear, while lowering the valve rod 102 reverses the application of vacuum and the venting of the chamber 92 and causes the piston 93 to move to the left and shift the transmission into high.

Preferably a vacuum accumulator or reserve tank 107 is connected to the conduit 39 between the control valve 97 and the check valve 43 in the arrangement shown in Fig. 5, whereby the above described shift into low gear on stopping the engine is accomplished by vacuum from the reserve tank 107 in place of the spring 24. When the all vacuum system of Fig. 5 is employed without the vacuum reserve tank 107, the shift into low will be accomplished as long as the engine is operating to produce the necessary vacuum in the manifold. However, without the reserve tank 107, upon stopping the engine the gears will remain in whatever gear ratio they may be at the time. The purpose of the reserve tank 107 is to take the place of the spring 24 to accomplish an automatic shift into low whenever the engine stops, with resulting raising of the valve rod 102. The size of the tank is sufficient to provide enough vacuum to accomplish such shift. Being connected to the conduit 39 between the control valve 97 and the check valve 43, the reserve tank 107 is substantially never open to atmosphere and the vacuum established in it through connection to the conduit 39 is maintained therein.

In either type of system the automatic shifting operation can be cut out and the axle transmission locked in either high or low gear ratio merely by setting the lever 71 in the proper position. When the grip 77 is depressed to the lower broken line position shown in Fig. 2, the end 78 of the lever engages the low gear locking collar 81 to hold the valve rod 44 against movement in the position shown, in which the chamber 22 in Fig. 1, for example, is continuously vented to atmosphere, allowing the spring 24 to hold the transmission in low. Setting the lever in the other extreme position with the grip 77 raised, as shown in Fig. 3, causes it to engage the high gear locking collar 83 and hold the valve rod depressed in which position the chamber 22 is permanently connected to manifold vacuum and the piston 23 drawn to the left in Fig. 1 to hold the transmission in high gear. Even if vacuum is broken by opening the throttle wide, the check valve 43 will act to retain the vacuum previously established in the power unit 21 and prevent any shift out of high. Similarly, the all vacuum system shown in Fig. 5 can be locked in either high or low gear, or set for automatic operation by selective setting of the lever 71.

An indicator device is provided to show the driver whether the system is conditioned for high or low gear operation, and also whether the transmission is actually in high or low gear, whether automatic or locked. As shown in Fig. 1, an electric lamp 84 is connected by a conductor 85 to battery and by a second conductor 86 to a contact 87 positioned to be engaged by one of the collars 81, for example, when the valve rod 44 is lowered to supply vacuum to the power unit 21 and shift the transmission into high gear. A ground connection 88 or the like completes this lamp circuit, it being understood that, as illustrated, the collar 81, valve rod 44, valve casing etc., are formed of current conducting material.

A second lamp 111 is provided to indicate whether the transmission is actually in high or low gear. As illustrated in Fig. 1, the lamp circuit includes a conductor 112 connected to ground and a second conductor 113 connected to one contact 114 of a transmission operated switch having a second contact 116 connected by a conductor 117 to battery. As shown, the transmission shift lever 17 has a switch contact blade 118 arranged to close the lamp circuit when the axle transmission is in high and open such circuit when in low. Both indicator lamps are preferably mounted on the dash or any convenient place to be easily observed by the driver and are suitably marked. In operation, for example, when the lamp 84 is lighted he will know that the system is conditioned for operation in high gear. If the other lamp is not illuminated he will know that the transmission is not in high but is being held in low by torque and that the shift into high will be effected merely upon reversing torque by letting up on the accelerator pedal.

An additional function of the indicator lamps is to signal the driver when it is advisable to shift the axle transmission up or down. For example, assuming a truck is being driven along a substantially level road with the axle transmission in high and the throttle partially open. Under such conditions, both indicator lamps will be lighted. When an upgrade is reached, the throttle opening will be increased and if the upgrade is sufficiently steep the throttle will be opened wide. The resulting break in vacuum conditions the system for shift into low. This extinguishes the lamp 84. However, the driving torque holds the gears in high and the other lamp 111 remains lighted. This signals the driver that he should shift to low and this is done by pedal manipulation to reverse the torque, as above described.

Likewise, when the top of the upgrade has been passed, the wide open throttle will again be partly closed, reestablishing manifold vacuum and conditioning the system for shifting into high gear. This again lights the lamp 84, but the lamp 111 remains extinguished inasmuch as the driving torque holds the gears in low. This signals the driver to shift into high by reversing torque, which is easily done, whereupon the light 111 is again lighted.

It will thus be apparent that when lamp 84 is lighted and lamp 111 is out, a signal to shift into low is given. When lamp 84 is out and lamp 111 is lighted, a signal to shift into high is given.

Both lamps will be lighted when the system is conditioned for high gear and the transmission is actually in high gear. When both lamps are out, the system is conditioned for low gear and the transmission is in such gear. The indicator is operative for all settings of the control lever 71.

For example, on a downshift from high to low when the vehicle is being driven, depressing the accelerator 56 to open the throttle 41, as hereinbefore described, breaks the manifold vacuum and shifts the control valve 31 or 97 to condition the power unit for low gear, but the transmission is held in high by the driving torque. This condition is indicated by the lamp 84 being extinguished and the lamp 111 being lighted. As soon as the driver lets up on the accelerator pedal 56 to close the throttle 41, the resulting reversal of torque relieves the gears and permits the power unit 21 or 91 to complete the shift to low, which is indicated by the extinguishing of the lamp 111. As above pointed out, the latter shift is made possible by the delay valve 57 delaying the effect on the diaphragm 51 of the restored manifold vacuum.

The present invention includes an improved arrangement for insuring accurate speedometer reading for each gear ratio of the axle transmission. As illustrated in Fig. 1, the speedometer 121 is driven by a conventional cable 122 from the vehicle drive shaft (not shown) through a gear box 123 having two gear ratios and a gear shift operated by a shift lever 124. Mechanism is provided for moving the shift lever 124 from one position to another to shift the speedometer driving gears whenever the gears of the axle transmission 16 are shifted to order to obtain a true reading under all driving conditions. As shown, the speedometer shift lever 124 is connected to one end of an armature 125 of a solenoid 126 having a coil 127. One end of the solenoid coil 127 is grounded, while the other is connected by a conductor 128 to the switch contact 114, whereby the solenoid is energized whenever the axle transmission 16 is in high gear and is deenergized when the transmission is in low gear. A tension spring 129 connected between the speedometer shift lever 124 and a fixed point causes the speedometer gears to shift into proper ratio when the axle transmission is in low and the solenoid de-energized.

This mechanism automatically adapts the speedometer drive gears to the axle transmission, shifting the speedometer gears upon each shift of the axle transmission and thus insuring a true speedometer reading under all conditions of operation.

Although certain specific embodiments of the invention have been described and illustrated in detail, the invention can be variously modified and adapted within the scope of the appended claims.

Having thus set forth the nature of my invention, I claim:

1. A control system for use in a motor vehicle having an internal combustion engine provided with an inlet manifold, a multi-speed transmission including high and low gear ratios and gear shifting mechanism for said transmission, comprising a power mechanism for shifting said transmission from one gear ratio to another including a pressure differential operated member connected to said shift mechanism, a control valve for regulating the application of pressure differential to said member, said valve being movable between one position in which said member is caused to shift said transmission into high gear and a second position in which said member is caused to shift said transmission into low gear, a vacuum actuated operating means for moving said valve from one position to the other in accordance with the degree of vacuum in said manifold, and means for selectively locking said valve in either of said positions irrespective of the vacuum condition in said manifold to thereby selectively lock said transmission in high or low gear.

2. A control system for use in a motor vehicle having an internal combustion engine provided with an inlet manifold, a multi-speed transmission including high and low gear ratios and gear shifting mechanism for said transmission, comprising a power mechanism for shifting said transmission from one gear ratio to another including a pressure differential operated member connected to said shift mechanism, a control valve for regulating the application of pressure differential to said member, said valve being movable between one position in which said member is caused to shift said transmission into high gear and a second position in which said member is caused to shift said transmission into low gear, a vacuum actuated operating means for moving said valve from one position to the other in accordance with the degree of vacuum in said manifold, and means for selectively locking said valve in either of said positions irrespective of the vacuum condition in said manifold to thereby selectively lock said transmission in high or low gear, including a lever movable to three positions, and spaced means connected to said valve adapted to engage said lever in one position to lock said valve with said transmission in high gear, and to engage said lever in another position to lock said valve with said transmission in low gear, and to disengage said lever in its third position to release said valve for automatic operation by said vacuum actuated means.

3. A control system for use in a motor vehicle having an internal combustion engine provided with an inlet manifold, a multi-speed transmission including high and low gear ratios and gear shifting mechanism for said transmission, comprising a power mechanism for shifting said transmission from one gear ratio to another including a pressure differential operated member connected to said shift mechanism, a control valve having a valve rod for regulating the application of pressure differential to said member, said valve being movable between one position in which said member is caused to shift said transmission into high gear and a second position in which said member is caused to shift said transmission into low gear, a vacuum actuated operating means for moving said valve from one position to the other in accordance with the degree of vacuum in said manifold, and means for selectively locking said valve in either of said positions irrespective of the vacuum condition in said manifold to thereby selectively lock said transmission in high or low gear including a three position lever, and spaced means on said rod adapted to engage said lever in one position to lock said valve with said transmission in high gear, and to engage said lever in another position to lock said valve with said transmission in low gear, and to disengage said lever in its third position to release said valve for automatic operation by said vacuum actuated means.

4. A control system for use in a motor vehicle having an internal combustion engine provided with an inlet manifold, a multi-speed transmission including high and low gear ratios and gear shifting mechanism for said transmission, comprising a power mechanism for shifting said transmission from one gear to another including a pressure differential operated member connected to said shift mechanism, a control valve connected to said manifold for regulating the application of vacuum from said manifold to said member, and a vacuum responsive valve-operating means for operating said valve in response to variations in manifold vacuum, and means for delaying the operation of said valve operating means to cause said gear shifting mechanism to shift the transmission into high gear upon re-establishing an operating vacuum in said manifold after breaking of the vacuum.

5. The combination in a control system for a transmission shift mechanism having a pressure differential operated power unit and a control valve for controlling the application of pressure differential to said unit, of an operating member connected to said valve and responsive to manifold vacuum for operating said valve to cause said unit to shift into high gear when vacuum is effective and to shift into low gear when vacuum is ineffective, and means for delaying the application of sufficient pressure differential to said valve operating member to operate the valve to cause the power unit to shift the transmission into high gear when vacuum is first restored after being ineffective.

6. The combination in a control system for a transmission shift mechanism having a vacuum operated power unit and a control valve for controlling the application of vacuum to said unit and venting said unit to atmosphere, of an operating member connected to said valve and responsive to manifold vacuum for operating said valve to cause said unit to shift into high gear when vacuum is effective and to shift into low gear when vacuum is ineffective, and means for delaying the application of sufficient pressure differential to said valve operating member to operate the valve to cause the power unit to shift the transmission into high gear when vacuum is first restored after being ineffective.

7. A control system for use in a motor vehicle having an engine provided with an inlet manifold, a multi-speed transmission including high and low gear ratios, and gear shift mechanism for said transmission, comprising a power mechanism for selectively shifting said transmission into one or the other of said gear ratios including a differential pressure-operated member connected to said shift mechanism, a control valve connected to said manifold and controlling the application of pressure differential to said member, and mechanism responsive to manifold vacuum for operating said valve to apply a pressure differential to said member to shift said transmission into one gear ratio when the manifold vacuum is above a determinate amount, and to vary the pressure differential on said member to shift said mechanism into another gear ratio when said vacuum is less than said determinate amount, and means adapted to delay the application of sufficient increase in manifold vacuum to said valve operating mechanism to operate the valve to cause a shift of the transmission into one of said gear ratios after the vacuum has dropped below the predetermined amount.

8. A control system for use in a motor vehicle having an engine provided with an inlet manifold, a multi-speed transmission including high and low gear ratios, and gear shift mechanism for said transmission, comprising a power mechanism for selectively shifting said transmission into one or the other of said gear ratios including a differential pressure-operated member connected to said shift mechanism, a control valve connected to said manifold and controlling the application of pressure differential to said member, and mechanism responsive to manifold vacuum for operating said valve to apply a pressure differential to said member to shift said transmission into one gear ratio when the manifold vacuum is above a determinate amount, and to vary the pressure differential on said member to shift said mechanism into another gear ratio when said vacuum is less than said determinate amount, and means adapted to delay the effect of an increase in manifold vacuum on said mechanism including a check valve connecting said manifold to said mechanism and adapted to open upon a break in manifold vacuum and to partially close upon an increase in manifold vacuum.

9. A control system for use in a motor vehicle having an engine provided with an inlet manifold, a multi-speed transmission including high and low gear ratios, and gear shift mechanism for said transmission, comprising a power mechanism for selectively shifting said transmission into one or the other of said gear ratios including a differential pressure-operated member connected to said shift mechanism, a control valve connected to said manifold and controlling the application of pressure differential to said member, and mechanism responsive to manifold vacuum for operating said valve to apply a pressure differential to said member to shift said transmission into one gear ratio when the manifold vacuum is above a determinate amount, and to vary the pressure differential on said member to shift said mechanism into another gear ratio when said vacuum is less than said determinate amount, and means adapted to delay the effect of an increase in manifold vacuum on said mechanism including a check valve connecting said manifold to said mechanism and adapted to open upon a break in manifold vacuum and to partially close upon an increase in manifold vacuum, and means for adjusting the degree of closing of said check valve.

10. A control system for use in a motor vehicle having an engine provided with an inlet manifold, a multi-speed transmission including high and low gear ratios, and gear shift mechanism for said transmission, comprising a power mechanism for selectively shifting said transmission into one or the other of said gear ratios including a differential pressure-operated member connected to said shift mechanism, a control valve connected to said manifold and controlling the application of pressure differential to said means, and mechanism responsive to manifold vacuum for operating said valve to apply a pressure differential to said member to shift said transmission into one gear ratio when the manifold vacuum is above a determinate amount, and to vary the pressure differential on said member to shift said mechanism into another gear ratio when said vacuum is less than said determinate amount, means indicating when said system is conditioned to shift said transmission into high gear, and means indicating when said transmission is in high gear.

11. A control system for use in a motor vehicle having an engine provided with an inlet manifold, a multi-speed transmission including high and low gear ratios, and gear shift mechanism for said transmission, comprising a power mechanism for selectively shifting said transmission into one or the other of said gear ratios including a differential pressure-operated member connected to said shift mechanism, a control valve connected to said manifold and controlling the application of pressure differential to said means, and mechanism responsive to manifold vacuum for operating said valve to apply a pressure differential to said member to shift said transmission into one gear ratio when the manifold vacuum is above a determinate amount, and to vary the pressure differential on said member to shift said mechanism into another gear ratio when said vacuum is less than said determinate amount, means visibly indicating when said system is conditioned to shift said transmission into high gear, and means visibly indicating when said transmission is in high gear.

References Cited in the file of this patent

UNITED STATES PATENTS

| | | |
|---|---|---|
| 1,958,788 | Harper | May 15, 1934 |
| 2,001,337 | Wiedmaier | May 14, 1935 |
| 2,019,146 | Livermore | Oct. 29, 1935 |
| 2,275,944 | Breese | Mar. 10, 1942 |
| 2,346,681 | Harper | Apr. 18, 1944 |
| 2,365,732 | Snow | Dec. 26, 1944 |
| 2,506,105 | Price | May 2, 1950 |